(12) United States Patent
Hluchan

(10) Patent No.: US 9,683,142 B2
(45) Date of Patent: Jun. 20, 2017

(54) COMPOSITIONS

(71) Applicant: POLYSEAM LIMITED, Huddersfield, West Yorkshire (GB)

(72) Inventor: Wolodymyr Hluchan, Huddersfield (GB)

(73) Assignee: POLYSEAM LIMITED, Huddersfield, West (GB)

( * ) Notice: Subject to any disclaimer, the term of this patent is extended or adjusted under 35 U.S.C. 154(b) by 0 days.

(21) Appl. No.: 14/436,193

(22) PCT Filed: Oct. 18, 2013

(86) PCT No.: PCT/GB2013/052726
§ 371 (c)(1),
(2) Date: Apr. 16, 2015

(87) PCT Pub. No.: WO2014/064428
PCT Pub. Date: May 1, 2014

(65) Prior Publication Data
US 2015/0275055 A1    Oct. 1, 2015

(30) Foreign Application Priority Data

Oct. 22, 2012  (GB) .................................. 1218959.3
Jul. 8, 2013   (GB) .................................. 1312224.7

(51) Int. Cl.
| | |
|---|---|
| *C08L 31/04* | (2006.01) |
| *D21H 19/18* | (2006.01) |
| *C08K 3/00* | (2006.01) |
| *H01B 1/12* | (2006.01) |
| *C09J 125/14* | (2006.01) |
| *C09J 123/22* | (2006.01) |
| *C09J 133/08* | (2006.01) |
| *C08L 33/08* | (2006.01) |
| *C08K 3/26* | (2006.01) |

(52) U.S. Cl.
CPC .............. *C09J 125/14* (2013.01); *C08K 3/00* (2013.01); *C09J 123/22* (2013.01); *C09J 133/08* (2013.01); *C08K 3/26* (2013.01); *C08L 33/08* (2013.01)

(58) Field of Classification Search
None
See application file for complete search history.

(56) References Cited

U.S. PATENT DOCUMENTS

| | | | | |
|---|---|---|---|---|
| 4,225,383 A | * | 9/1980 | McReynolds | .......... D21H 17/35 162/145 |
| 6,184,274 B1 | | 2/2001 | Herold | |
| 6,828,382 B1 | | 12/2004 | Loth | |
| 2005/0159549 A1 | | 7/2005 | Kendig | |
| 2012/0199199 A1 | | 8/2012 | Wood | |

FOREIGN PATENT DOCUMENTS

| | | |
|---|---|---|
| CN | 101302420 B | 11/2008 |
| DE | 20320472 U1 | 8/2004 |
| EP | 1531172 A1 | 5/2005 |
| GB | 1426763 A | 3/1976 |
| WO | WO-2011/047185 A1 | 4/2011 |

OTHER PUBLICATIONS

Search Report issued on GB Application No. 1218959.3, dated Mar. 28, 2013.
Search Report issued on GB Application No. 1318407.2, dated Mar. 7, 2014.
International Search Report issued on International Patent Application No. PCT/GB2013/052726, dated Dec. 12, 2013.

\* cited by examiner

*Primary Examiner* — Susannah Chung
*Assistant Examiner* — Robert T Butcher
(74) *Attorney, Agent, or Firm* — Howson & Howson LLP

(57) ABSTRACT

A sealant composition comprising: (a) from 10 to 40 wt % of an acrylic polymer or copolymer; (b) from 20 to 65 wt % of a powdered filler; and (c) from 0.1 to 20 wt % of a hydrocarbon polymer.

10 Claims, No Drawings

COMPOSITIONS

CROSS-REFERENCE TO RELATED APPLICATIONS

This application is a US national phase of International Patent Application No. PCT/GB2013/052726, filed Oct. 18, 2013, which claims the benefit of the priority of GB Patent Application No. 1218959.3, filed Oct. 22, 2012 and GB Patent Application No. 1312224.7, filed Jul. 8, 2013. These priority applications are incorporated by reference herein.

The present invention relates to improved sealant compositions and to uses thereof.

Sealant compositions are used in many applications in building construction and decoration, both internally and externally. The types of surfaces which are commonly bonded by sealant compositions are varied. For example window frames made of plastic, wood or metals will sometimes need to be sealed to absorbent surfaces, for example brickwork and plaster, and may sometimes need to be sealed to smoother low energy surfaces, for example plastics or metals. Other materials for example wood, cement, ceramics and stone are also commonly present in buildings. Due to the varied nature of the many different types of materials used in construction there exists a wide variety of sealant compositions, typically comprising different chemical components and technologies. During a construction project it may be necessary to use a number of these sealants at different locations in a building. This is inefficient and expensive and may lead to errors.

It is very important that the correct sealant compositions having appropriate properties are used. This is essential for example in the sealing of high-level glazing in multi-storey buildings where failure of the sealant could have very serious consequences. Such sealants must of course be strong and durable but they also need to have a degree of flexibility to accommodate vibrations. Sealant compositions presently used for such purposes are commonly silicone based. However, silicone based sealants are expensive and complex to manufacture due to the water-sensitive nature of the starting materials used. In addition, once a container of silicone based sealant has been opened this should usually be used quickly or it will have to be thrown away as it reacts with moisture.

Sealant compositions ideally need to provide a strong and secure finish. In some applications it is necessary that the sealant material is not too hard or brittle as this may cause cracks to appear. Thus a degree of flexibility is often desirable. Depending on the location of the sealant, high water resistance and/or UV stability may be required. In some cases it may be desirable to paint the sealant composition. Some sealant compositions of the prior art do not facilitate painting readily. Others cause staining of surrounding areas when used on absorbent surfaces as the sealant "bleeds" into the surface material.

For some applications sealant compositions must be tolerant to wide variations of temperature, and thus must not show too much expansion or contraction on heating or cooling within and around the intended temperature range of use.

It is an aim of the present invention to provide a sealant composition having improved properties compared with compositions of the prior art.

According to a first aspect of the present invention there is provided a sealant composition comprising:
(a) from 10 to 40 wt % of an acrylic polymer or copolymer;
(b) from 20 to 65 wt % of a powdered filler; and
(c) from 0.1 to 20 wt % of a hydrocarbon polymer.

Component (a) is an acrylic polymer or copolymer. This may be selected from any polymeric material prepared from a starting material including an acrylic acid based monomer. By acrylic acid based monomer we mean to include acrylic acid, esters of acrylic acid, salts of acrylic acid, substituted acrylic acids and substituted esters and salts of acrylic acid.

Suitable acrylic acid based monomers for use in the preparation of component (a) include acrylic acid, methacrylic acid, sodium acrylate, sodium methacrylate, methyl acrylate and methyl methacrylate.

Preferred acrylic acid based monomers include alkyl acrylates, for example methyl, ethyl, propyl, butyl and 2-ethylhexyl acrylate and methyl, ethyl, propyl, butyl and 2-ethylhexyl methyl methacylate.

Component (a) may be a homopolymer or a copolymer. In some embodiments component (a) is a copolymer prepared from a mixture of monomers comprising two or more acrylic acid based monomers. In some embodiments component (a) is prepared from a mixture of monomers including at least one acrylic acid based monomer and at least one additional non-acrylic monomer.

Suitable non-acrylic monomers which may be present in the mixture used to prepare component (a) include alkenes, styrene based monomers, and vinyl based monomers, for example styrene, vinyl acetate, ethyl vinyl acetate, butyl acetate, vinyl chloride, vinyl ester of versatic acid and ethylene.

When component (a) comprises a copolymer it may be a random copolymer or a block copolymer.

Component (a) is preferably prepared from monomers including a 2-ethylhexyl acrylate and/or a butyl acrylate.

Most preferably component (a) comprises a copolymer of styrene and acrylic acid.

Preferably component (a) comprises a water soluble or water-dispersible polymer and is incorporated into the composition as an aqueous composition.

Preferably component (a) is present in the composition in an amount of at least 12 wt %, preferably at least 15 wt %, more preferably at least 18 wt %, preferably at least 20 wt %, for example at least 22 wt %.

Component (a) may be present in the composition in an amount of up to 40 wt %, preferably up to 38 wt %, more preferably up to 36 wt %, for example up to 34 wt % or up to 32 wt %.

The above amounts refer to the amount of active polymeric material present in the composition. However this is suitably provided as an aqueous composition comprising from 40 to 80 wt % polymeric material, preferably from 50 to 70 wt %, for example from 55 to 65 wt %, suitably about 60 wt %.

In some especially preferred embodiments component (a) is present in the composition in an amount of from 24 to 30 wt %. This may be suitably provided as an aqueous composition comprising about 60 wt % polymeric material. The aqueous composition is thus present in the sealant composition in an amount of from 40 to 50 wt %.

Component (a) may comprise a mixture of two or more acrylic polymers or copolymers. In such embodiments the above amounts refer to the total of all such compounds present in the composition.

In this specification unless otherwise stated all amounts refer to the amount of active ingredient present in the composition.

Component (b) comprises a powdered filler. The powered filler is suitably a chemically inert material that is present in fine particulate form.

Suitable powdered fillers include calcium carbonate, dolomite, limestone, chalk, marble, calcite, whitings, aluminium silicates, barytes, titanium dioxide, talc, aluminium dioxide, magnesium hydroxide, silicates.

An especially preferred powdered filler for use herein is dolomite.

The powdered filler preferably has an average particle size of less than 100 microns, preferably less than 80 microns, preferably less than 60 microns, more preferably less than 50 microns, for example less than 40 microns.

The powdered filler preferably has an average particle size of at least 1 micron, preferably at least 5 microns, more preferably at least 10 microns, suitably at least 12 microns, for example at least 15 microns.

Average particle size may suitably be measured using standard sieving techniques.

In especially preferred embodiments the powdered filler has an average particle size of from 20 to 30 microns.

The present inventors have found that using particles having an average size of less than 40 microns is advantageous because a smaller particle size provides a glossy aspect. The surface of the sealant is therefore less grainy or irregular and is thus less matt in appearance.

Component (b) is preferably present in the sealant composition of the present invention in an amount of at least 22 wt %, preferably at least 25 wt %, more preferably at least 30 wt %, for example at least 32 wt %, at least 34 wt % or at least 36 wt %.

Component (b) may be present in the sealant composition in an amount of up to 62 wt %, suitably up to 60 wt %, for example up to 58 wt %; up to 56 wt % or up to 54 wt %.

In some especially preferred embodiments component (b) is present in the sealant composition in an amount of from 40 to 50 wt %.

Component (b) may comprise a mixture of powered fillers. In such embodiments the above amounts refer to the total amount of all such compounds present in the composition.

Component (c) is a hydrocarbon polymer. By hydrocarbon polymer we mean to refer to a polymeric material consisting essentially of hydrogen and carbon atoms. Preferred hydrocarbon polymers are polyalkenes.

Most preferably component (c) is a polyisobutene. Preferred polyisobutenes for use herein have an average molecular weight of from 500 to 5000, preferably from 750 to 2500, most preferably from 1000 to 1500.

Component (c) is preferably present in the sealant composition of the present invention in an amount of at least 0.2 wt %, preferably at least 0.5 wt %, more preferably at least 0.7 wt %, for example at least 0.8 wt %.

Component (c) may be present in the sealant composition in an amount of up to 18 wt %, suitably up to 15 wt %, preferably up to 12 wt %, more preferably up to 10 wt %, for example up to 8 wt % or up to 6 wt %.

In especially preferred embodiments component (c) is present in the sealant composition of the present invention in an amount of from 1 to 5 wt %.

In some embodiments the composition further comprises (d) a surfactant compound.

Suitable surfactant compounds include anionic surfactants, cationic surfactants, amphoteric surfactants, non-ionic surfactants, and mixtures thereof.

Preferably component (d) comprises an anionic surfactant. Suitable anionic surfactants for use herein include alkyl phenol ethoxylates, alkyl sulfonates, alcohol ethoxylates, alkyl sulfates, carboxylates and phosphates.

Preferred anionic surfactants are alkyl sulfate surfactants. Especially preferred are sodium salts of $C_{10}$ to $C_{16}$ alkyl sulfates.

Component (d) may suitably be present in the sealant composition in an amount of from 0.001 to 10 wt %, preferably from 0.01 to 1 wt %, suitably from 0.05 to 0.5 wt %, for example from 0.1 to 0.2 wt %.

Component (d) may comprise a mixture of surfactants. In such embodiments the above amounts refer to the total amount of all surfactants present in the composition.

In some embodiments the sealant composition of the present invention further comprises (e) a rheology modifier.

By rheology modifier we mean to refer to a material which changes the properties of a material under shear stress. The sealant compositions of the present invention may suitably be applied using a caulking gun or a pistol gun. The inclusion of a rheology modifier helps control flow of the sealant composition from the gun into a joint or gap. Flow of the composition is required when shear stress is applied via the gun and the flow stops when the shear stress stops.

Suitably rheology modifiers for use herein include cellulosic compounds, for example hydroxyethyl cellulose, ethyl hydroxyethyl cellulose and methyl cellulose; bentonite clays and other synthetic clays; and magnesium aluminium silicate.

Preferred rheology modifiers are synthetic silicate clays.

Component (e) is preferably present in the sealant composition of the present invention in an amount of from 0.01 to 10 wt %, preferably from 0.1 to 5 wt %, more preferably from 0.25 to 3 wt %, for example from 0.5 to 2 wt %.

A mixture of rheology modifiers may be present. In such embodiments the above amounts refer to the total amount of all such components present.

As mentioned above the sealant composition of the present invention may suitably be applied using a caulking gun or piston gun. In such embodiments the composition preferably comprises from 0.5 to 1.5 wt % rheology modifier.

An advantage of the sealant composition of the present invention is that it can be packaged in a squeezy flexible tube. Packaging of this type will be known to the skilled person and is often used for toothpaste or topical creams. Thus the present invention may provide a flexible tube having a lid/cap and which contains a composition of the first aspect.

Compositions packaged in a flexible tube typically contain from 0.1 to 0.5 wt % rheology modifier. Such compositions are usually of lower viscosity than compositions packaged for use with a caulking gun or piston gun.

In addition to the rheology modifier mentioned above the composition may further comprise a thickener, for example a polymeric thickener. Suitable thickeners include polyacrylate thickeners. The thickener may be present in an amount of from 0.1 to 2 wt %.

The sealant composition of the present invention may comprise one or more further ingredients selected from defoamers, perfumes, preservatives, dyes and pigments, polymers, thickeners, pH adjusting agents, mineral oils, silicone oils, fungicides, bactericides, iron oxides, titanium dioxide, glycols, polyurethanes, acrylate thickeners, sodium hydroxide, ammonia, amino methyl propanol, cosolvents, humectants and coalescent agents.

In some embodiments the sealant composition comprises one or more fire retardant compounds. Fire retardant compounds typically char and swell and do not burn.

Suitable fire retardant compounds for use in the compositions of the present invention include aluminium trihydrate, carbonates, borate compounds, antimony compounds, graphite, phosphates, halogenated compounds, melamine, magnesium hydroxide, phosphorous and silicates. Further suitable fire retardant compounds include carbonates of calcium, calcined clays, calcites, dolomites, metal oxides and metal hydroxides.

The fire retardant compounds may be included in the sealant composition in an amount of from 0.1 to 70 wt %, preferably from 5 to 70 wt %. These may be used in place of some or all of the powdered filler.

The composition of the present invention may comprise a buffer. Suitable buffers include 2-amino-2-methyl-1-propanol and alkali metal hydroxides.

The sealant composition of the present invention is preferably an aqueous composition. By this we mean that water is the major solvent present in the composition. The composition may also include minor proportions of other water-miscible cosolvents, for example alcohols, including polyols. However in preferred embodiments water makes up at least 60 wt % of all solvents present in the composition, preferably at least 70 wt %, more preferably at least 80 wt %, suitably at least 90 wt %, at least 95 wt % or at least 98 wt %. Preferably water is the only solvent present in the sealant composition.

The compositions of the present invention suitably comprise at least 1 wt % water, preferably at least 5 wt %, more preferably at least 7.5 wt %, for example at least 10 wt % or at least 12.5 wt %.

The compositions of the present invention suitably comprise up to 40 wt % water, preferably up to 30 wt %, more preferably up to 25 wt %, suitably up to 22.5 wt %.

In some especially preferred embodiments the sealant compositions of the present invention comprise form 16 to 20 wt % water.

The sealant composition of the present invention preferably comprises less than 10 wt % organic solvents, preferably less than 5 wt %, more preferably less than 2.5 wt %, preferably less than 1 wt %, suitably less than 0.1 wt %, for example less than 0.01 wt %. Preferably the sealant composition of the present invention is substantially free of organic solvents.

The sealant composition of the present invention preferably comprises less than 10 wt % silicone compounds, preferably less than 5 wt %, more preferably less than 2.5 wt %, suitably less than 1 wt %, for example less than 0.1 wt % or less than 0.01 wt %.

Preferably the sealant composition of the present invention is substantially free of silicone compounds.

The sealant compositions of the present invention preferably comprises less than 10 wt % silicon-containing compounds, preferably less than 5 wt %, more preferably less than 2.5 wt %, suitably less than 1 wt % for example less than 0.1 wt % or less than 0.01 wt %.

Preferably the sealant compositions of the present invention are substantially free of silcon-containing compounds.

In preferred embodiments the sealant compositions of the present invention comprise less than 5 wt % terpene compounds, preferably less than 1 wt %, more preferably less than 0.1 wt % or less than 0.01 wt %.

In preferred embodiments the sealant compositions of the present invention comprises less than 5 wt % hydrocolloid compounds, preferably less than 1 wt %, more preferably less than 0.1 wt % or less than 0.01 wt %.

In preferred embodiments the sealant compositions of the present invention comprises less than 5 wt % functionalised polypropylene polymers, preferably less than 1 wt %, for example less than 0.1 wt % or less than 0.01 wt %.

The composition of the present invention is preferably in the form of a gel or paste. It has a consistency that enables it to be squeezed from a tube or spread onto a surface but it retains its shape once it is on the surface.

The sealant composition of the present invention is suitably applied to a surface in the form of a paste or gel but then solidifies on the surface to form a solid composition.

In some embodiments the composition will solidify or "cure" when it is left for a period of time, for example due to evaporation of solvent. In some embodiments solidification of the composition may be assisted by application of heat and/or light, for example ultraviolet or infrared radiation. In some embodiments the compositions may be cured by blowing air over the surface.

Prior to use the sealant composition of the present invention may be stored in a suitable sealed container. However once opened the composition can be stored in the same container without using any special conditions, for periods of up to several weeks. The composition may self-seal or be sealed using a cap during this period. Unlike many silicone based compositions of the prior art, the compositions of the present invention are not water-sensitive or air-sensitive. This means that sealant composition in an opened container can be used several days, weeks or even months after the container has been opened. This also allows the composition to be packaged in a flexible tube.

The composition of the present invention is preferably a substantially homogeneous composition. As mentioned above in preferred embodiments the compositions are in the form of a gel or paste. They are preferably not in the form of a tape or laminate.

The sealant composition of the present invention may be used for a variety of purposes, for example to seal a joint or surface or to hold a fitting in place. The composition may also be used as an adhesive.

Once the sealant composition has been applied and has cured in position it has highly advantageous properties. Compositions of the present invention have high chemical and water resistivity as well as UV stability. The compositions have also been found to be stable across a range of temperatures from −20° C. to 75° C.

The sealant compositions of the present invention have excellent adhesive properties and have been found to bond effectively to a wide range of materials including wood, metal, glass, plastic, cement, brickwork, plaster, gypsum, stone, textiles, ceramics, painted surfaces and other non-silicone based sealants.

When used on absorbent surfaces the compositions have been found not to leak into the surrounding area causing discolouration, a problem that occurs with some compositions of the prior art.

The sealant compositions of the present invention may include a pigment or dye. It is also possible to paint the surface of the composition if desired.

The sealant compositions of the present invention may be used in a wide variety of applications in the external and internal construction of buildings. For example the compositions can be used as bathroom sealants, around joins where pipes run through walls, around electrical fittings, in kitchens, around windows and doors, around the joins of walls to floors or ceilings.

Some sealant compositions of the prior art are only suitable for particular applications and will not bond effectively to all surface types. Thus multiple products will typically be used in the construction or renovation of an average building. The sealant composition of the present invention can be used in many different applications and on multiple surfaces.

The compositions of the present invention when cured have been found to have highly advantageous properties which render them suitable for use in securing high level glazing. As well as being UV resistant, thermally stable, water and air resistant, and having excellent adherence to a variety of materials, the compositions have been found to have an elastic modulus which varies according to the applied load.

Under static conditions the cured sealant compositions of the present invention are very strong and have a high elastic modulus. If no stress is applied to the sealant composition it allows very little movement. However under high stress the material becomes much more flexible and allows much more movement, characteristic of a material with a low elastic modulus.

Thus a window pane may be held very securely and firmly in position within a frame. However should vibrations or other movement occur the sealant composition will allow movement of the window pane within the frame without failing.

The sealant composition of the present invention appears to show a varying degree of elastic movement depending on the movement and forces applied to it.

The invention will now be further described with reference to the following non-limiting examples.

EXAMPLE 1

A sealant composition of the present invention was prepared comprising the following components:

TABLE 1

| Ingredient | Wt % |
| --- | --- |
| Styrene Acrylic | 40 to 50 |
| Defoamer | <0.1 |
| Clay (rheology modifier) | 0.5 to 2 |
| Alkyl sulphate surfactant | 0.1 to 0.2 |
| Polyisobutene | 1 to 5 |
| Dolomite | 40 to 50 |
| Polyacrylate | <1 |
| Amino-2-methyl-1-propanol | <0.1 |
| Preservative | <0.1 |

The styrene acrylic polymer is provided as an aqueous composition comprising 55 to 60 wt % polymeric material.

The properties of the composition of the invention were compared with traditional silicone sealant compositions. The silicone compositions contained silicone polymer, plasticiser, low moisture content filler, pigment, cross-linker, adhesion promoter in solvent and a catalyst. An acid curing silicone composition and a neutral curing silicone composition were tested.

EXAMPLE 2

The composition of table 1, an acid/acetoxy curing silicone sealant and a neutral curing silicone sealant were each applied to a UPVC surface.

After curing for one week the acetoxy curing silicone could easily be removed but the neutral silicone and the composition of table 1 could not.

EXAMPLE 3

At a swimming pool, a neutral curing silicone composition, an acetoxy curing silicone composition and the composition of table 1 were applied to joints in shower cubicles. The neutral curing silicone was easily removed during routine cleaning because it was soft and of a lower modulus than the composition of table 1 and the acetoxy curing silicone.

A single composition according to the present invention is able to be used on a variety of different surfaces, whereas a number of different silicone sealant compositions are needed. For example the composition of table 1 can be used on dry lining applications where silicones would not be used due to poor adhesion, staining and repelling of paint.

The composition of the present invention exhibited a low dirt pick up and showed improved durability compared to neutral cure low modulus silicone sealants.

The composition of the present invention exhibits varying elastic modulus properties enabling it to be used in a variety of different environments. Silicone sealants do not exhibit such properties and are either low modulus or high modulus compositions.

The composition of the present invention can be used as an adhesive. However, silicone sealants are generally too soft for such purposes and do not provide a rigid bond.

The 3D movement of compositions of the present invention has been independently assessed according to ISO8339 and ISO8340. The results indicated that shear movements should not cause problems when compositions of the invention are used.

The composition of the present invention has little or no odour. Silicone compositions may release harmful chemicals on cross-linking.

The composition of the present invention has been tested and has been found to comply with the requirements of GEV and the results correspond to the EMICODE® emission class $EC1^{plus}$. This is the best possible environmental and indoor hygiene health protection mark.

The composition of the present invention was found to have no measurable content of volatile organic solvents.

The composition of the present invention may be painted whereas silicone sealants repel paints.

Unlike silicone sealants, the compositions of the present invention do not contaminate substrates and are compatible with and bond with other non-silicone sealants. This facilitates future repair and maintenance.

Prior to curing, the composition of the present invention may be cleaned up using water. For silicone compositions solvents are needed.

As the composition of the present invention is compatible with moisture it can be applied to damp substrates.

The composition of the present invention does not cure in an opened container such as a cartridge. Silicone sealants continue to cure following exposure to moisture.

The compositions of the present invention have a greater stability than many silicone sealants, with a shelf-life of more than 18 months, for example more than 24 months.

The compositions of the present invention have been found to have excellent fire retardant properties. When tested in accordance with BSEN 1366-3:2009 and BSEN 1366-4:2006 A1-2010 the composition of table 1 achieved a fire and insulation rating in excess of 240 minutes in linear joints.

The compositions of the present invention have also been found to have desirable acoustic properties when tested to BSEN ISO 10140-2:2010 international standard method for measurement of airborne sound insulation of building elements.

The invention claimed is:

1. An aqueous sealant composition which is not water-sensitive or air-sensitive comprising:
   (a) from 10 to 40 wt % of a copolymer of a styrene based monomer and an acrylic acid based monomer;
   (b) from 20 to 65 wt % of a powdered filler having an average particle size of less than 40 microns and selected from calcium carbonate, dolomite, limestone, chalk, marble, calcite, whitings, aluminium silicates, barytes, titanium dioxide, talc, aluminium dioxide, magnesium hydroxide and silicates; and
   (c) from 0.1 to 20 wt % of a polyisobutene having an average molecular weight of from 1000 to 1500, wherein the weight percentage is based on the total weight of the composition.

2. An aqueous sealant composition according to claim 1 wherein the acrylic acid based monomer comprises 2-ethylhexyl acrylate, butyl acrylate or both.

3. An aqueous sealant composition according to claim 1 wherein (a) comprises a copolymer of styrene and acrylic acid.

4. An aqueous sealant composition according to claim 1 wherein (a) is present in the composition in an amount of from 20 to 34 wt %.

5. An aqueous sealant composition according to claim 1 wherein (b) is present in the composition in an amount of from 36 to 54 wt %.

6. An aqueous sealant composition according to claim 1 wherein (c) is present in the composition in an amount of from 0.2 to 8 wt %.

7. An aqueous sealant composition according to claim 1 which further comprises (d) an anionic surfactant.

8. An aqueous sealant composition according to claim 1 which further comprises (e) a rheology modifier.

9. An aqueous sealant composition according to claim 1 which comprises less than 2.5 wt % silicone compounds.

10. An aqueous sealant composition which is not water-sensitive or air-sensitive comprising:
   (a) from 10 to 40 wt % of an acrylic polymer or copolymer comprising: one or more acrylic acid based monomers selected from acrylic acid, methacrylic acid, sodium acrylate, sodium methacrylate, methyl acrylate, methyl methacrylate and alkyl acrylates; and a vinyl based monomer selected from styrene, vinyl acetate, ethyl vinyl acetate, butyl acetate, vinyl chloride, vinyl ester of versatic acid and ethylene;
   (b) from 20 to 65 wt % of a powdered filler having an average particle size of less than 40 microns and selected from the group consisting of calcium carbonate, dolomite, limestone, chalk, marble, calcite, whitings, aluminium silicates, barytes, titanium dioxide, talc, aluminium dioxide, magnesium hydroxide and silicates; and
   (c) from 0.1 to 20 wt % of a polyisobutene having an average molecular weight of from 1000 to 1500, wherein the weight percentage is based on the total weight of the composition.

* * * * *